United States Patent
Braun et al.

(10) Patent No.: US 10,865,716 B2
(45) Date of Patent: Dec. 15, 2020

(54) CAMSHAFT ADJUSTER AND METHOD FOR DETERMINING THE SETTING OF A CAMSHAFT ADJUSTER

(71) Applicant: Schaeffler Technologies AG & Co. KG, Herzogenaurach (DE)

(72) Inventors: Wolfgang Braun, Garstadt (DE); Jens Heim, Bergrheinfeld (DE); Jens Schäfer, Herzogenaurach (DE); Andreas Thölke, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 985 days.

(21) Appl. No.: 15/321,580

(22) PCT Filed: Mar. 31, 2015

(86) PCT No.: PCT/DE2015/200221
§ 371 (c)(1),
(2) Date: Dec. 22, 2016

(87) PCT Pub. No.: WO2015/197054
PCT Pub. Date: Dec. 30, 2015

(65) Prior Publication Data
US 2017/0145928 A1    May 25, 2017

(30) Foreign Application Priority Data
Jun. 26, 2014   (DE) ........................ 10 2014 212 319

(51) Int. Cl.
*F02D 13/02*      (2006.01)
*F01L 1/344*      (2006.01)
(Continued)

(52) U.S. Cl.
CPC ........ *F02D 13/0219* (2013.01); *F01L 1/3442* (2013.01); *F01L 2001/3522* (2013.01); *F01L 2013/111* (2013.01); *Y02T 10/12* (2013.01)

(58) Field of Classification Search
CPC .... F02D 13/0219; F02D 41/009; F01L 1/344; F01L 1/3442; F01L 1/352; F01L 1/46; F01L 2013/111
(Continued)

(56) References Cited

U.S. PATENT DOCUMENTS 3,978,829 A * 9/1976 Takahashi ........... F02D 13/0215
                                                                                      123/90.15
5,289,805 A    3/1994 Quinn, Jr. et al.
(Continued)

FOREIGN PATENT DOCUMENTS

CN    101503971 A    8/2009
CN    101548068 A    9/2009
(Continued)

*Primary Examiner* — Jorge L Leon, Jr.
*Assistant Examiner* — Loren C Edwards
(74) *Attorney, Agent, or Firm* — Matthew Evans (57) ABSTRACT

A camshaft adjuster for adjusting the phase angle between a crankshaft and a camshaft of an internal combustion engine comprises an actuator, in particular, an electric motor, and an adjustment module, which comprises a drive element, which can be driven by the crankshaft, and an output element, which can be rotated relative to the drive element to a limited extent and which is provided to be securely coupled to the camshaft, wherein a signal generator, which is arranged so as to be fixed in position on the internal combustion engine and which has an inductance, is inductively coupled to a measurement circuit, which is integrated into the adjustment module and which has at least one resonant circuit component having electrical properties that depend on the said phase angle.

11 Claims, 4 Drawing Sheets

(51) Int. Cl.
*F01L 13/00* (2006.01)
*F01L 1/352* (2006.01)

(58) Field of Classification Search
USPC ............ 123/90.15, 90.16; 73/114.26, 114.27
See application file for complete search history.

(56) References Cited

U.S. PATENT DOCUMENTS

| | | | | |
|---|---|---|---|---|
| 5,522,352 | A * | 6/1996 | Adachi | ............... F01L 1/34406 |
| | | | | 123/90.15 |
| 2005/0253576 | A1 | 11/2005 | Nyce | |
| 2007/0101956 | A1* | 5/2007 | Schafer | ..................... F01L 1/34 |
| | | | | 123/90.15 |
| 2008/0284414 | A1 | 11/2008 | Giovanardi et al. | |
| 2014/0034000 | A1 | 2/2014 | Baumann | |

FOREIGN PATENT DOCUMENTS

| | | |
|---|---|---|
| DE | 4307010 A1 | 10/1993 |
| DE | 10108055 C1 | 8/2002 |
| DE | 102008039009 A1 | 2/2010 |
| DE | 102008039376 B4 | 2/2010 |
| DE | 102011083800 A1 | 4/2013 |
| DE | 102012213539 A1 | 2/2014 |
| DE | 102012215957 A1 | 5/2014 |
| EP | 2225816 B1 | 5/2011 |
| JP | S61107101 A | 5/1986 |
| JP | S62190414 A | 8/1987 |
| JP | 2007285774 A | 11/2007 |
| JP | 2012078238 A | 4/2012 |
| WO | 2005111383 A1 | 11/2005 |
| WO | 2011134955 A2 | 11/2011 |

* cited by examiner

CAMSHAFT ADJUSTER AND METHOD FOR DETERMINING THE SETTING OF A CAMSHAFT ADJUSTER

CROSS-REFERENCE TO RELATED APPLICATIONS

The present application is the United States National Stage Application pursuant to 35 U.S.C. § 371 of International Patent Application No. PCT/DE2015/200221, filed on Mar. 31, 2015, and claims priority to German Patent Application No. DE 10 2014 212 319.4 of Jun. 26, 2014, which applications are incorporated by reference in their entireties.

FIELD

The disclosure relates to a camshaft adjuster that is provided for adjusting the phase angle between a crankshaft and a camshaft of an internal combustion engine. Furthermore, the invention relates to a method, with which the setting of such a camshaft adjuster is detectable.

BACKGROUND

A method for determining the phase position of an adjustable camshaft is known, for example, from the German patent DE 10 2012 213 539 A1. In accordance with this method various measuring devices are used that are arranged, on the one hand, on the camshaft and, on the other hand, on the crankshaft of an internal combustion engine. A method, disclosed in the German patent DE 101 08 055 C1, for controlling an internal combustion engine with crankshaft sensors and camshaft sensors works in a corresponding manner.

SUMMARY

The object of the present disclosure is to determine the setting of the camshaft adjuster of an internal combustion engine in a way that is particularly simple and robust as compared to the cited prior art and at the same time to make it possible to perform a measurement not only when the internal combustion engine is stationary, but also when it is running.

This engineering object is achieved, according to the present disclosure, by means of a method for measuring the setting of a camshaft adjuster, i.e., for determining the phase angle between the camshaft and the crankshaft of an internal combustion engine. The embodiments and the advantages of the disclosure that are explained below in conjunction with the measurement method also apply mutatis mutandis to the device, i.e., the camshaft adjuster, and vice versa.

The camshaft adjuster is used in a well-known manner for adjusting the phase angle between a crankshaft and a camshaft of an internal combustion engine, where in this case an adjustment module of the camshaft adjuster can be actuated by means of an actuator, in particular, an electric motor or a hydraulic element.

The adjustment module comprises a drive element, which can be driven by means of the crankshaft, for example, by means of a chain drive or a belt drive, as well as an output element, which can be rotated to a limited extent relative to said drive element and is securely connected to a camshaft of the internal combustion engine. The camshaft may be provided for actuating the intake or exhaust valves of the internal combustion engine, for example, a gasoline or diesel engine.

A signal generator, with which a measurement circuit is inductively coupled, is arranged so as to be fixed in position on the internal combustion engine, where in this case the measurement circuit is integrated into the adjustment module, which can be rotated as a whole. Owing to the measurement setup, which comprises the signal generator and the measurement circuit, at least one resonant circuit is formed. At least one resonant circuit component, which may be found on the side of the measurement circuit, i.e., in or on the adjustment module, has electrical properties that depend on the phase angle between the camshaft and the crankshaft of the internal combustion engine.

Therefore, the setting of the camshaft adjuster is detected with a measurement setup that comprises a stationary part and a rotating part, where in this case only the stationary part has a line-conducted power supply. The rotating part comprises two modules, which can be pivoted relative to each other, i.e., on the one hand, the drive element of the camshaft adjuster and, on the other hand, the camshaft and components, which are securely connected to said camshaft. The detection of the angle, enclosed between the two modules, is equivalent to the detection of the setting of the camshaft adjuster. A detection of the angular position of the crankshaft is not required to determine the setting of the camshaft adjuster, but may be optionally present.

The resonant circuit component, which is arranged on the sides of the totally rotatable adjustment module and which has electrical properties, which depend on the phase angle between the camshaft and the crankshaft, may be provided in the form of a coil with variable inductance. In addition or as an alternative, the adjustment module may also have a resistance or a capacitance with variable electrical properties. In any case the electrical properties of the component of interest are a function of the angular position between the drive element and the output element of the adjustment module, i.e., a function of the setting of the camshaft adjuster. The one or more resonant circuit components, which are integrated into the adjustment module, affect the stationary signal generator. In particular, the coupling intensity between a stationary coil of the measurement setup and a rotating coil is a function of the frequency and the inductance set on the rotating part of the measurement setup. In particular, the signal attenuation and the phase position can be evaluated. A change in the inductance on the side of adjustment module results in a change in the frequency, at which the highest attenuation occurs. Therefore, the detection of a signal, fed back from the rotating part of the measurement setup to the stationary part of the measurement setup, is a clear indication of the setting of the camshaft adjuster. This applies not only when the internal combustion engine is running, i.e., when the camshaft is rotating, but also when the crankshaft is standing still.

With respect to the technical background reference is made to the German patent DE 10 2012 215 957 A1, which shows a compact resolver bearing, and to the worldwide patent WO 2011/134955 A2, which relates to a rolling bearing assembly with an angle sensor. Furthermore, with respect to the technical background reference is made to the German patent DE 10 2008 039 376 B4, which discloses a device for the inductive scanning of graduations of a mechanical roller counter.

According to a preferred embodiment, the measurement circuit, which is arranged on the side of the adjustment module, comprises two series-connected inductances. In this case a first inductance exhibits variable properties, which are a function of the setting of the camshaft adjuster, while a second inductance is not variable and is used exclusively to inductively couple between the measurement circuit and the signal generator. As in the case of the second inductance, a stationary inductance, which can be allocated to the signal generator, is also not variable. The stationary inductance and the second inductance, which is arranged on the side of the adjustment module, are preferably designed in terms of their geometry in such a way that small changes in the distance between the stationary and rotating parts of the measurement setup or eccentricities between the parts of interest have hardly any impact on the electrical properties of the resonant circuit. This feature can be achieved, for example, if one of the two said coils has a smaller diameter than the other coil, so that a displacement of the smaller coil relative to the larger coil has hardly any effect on the coupling between the coils.

The resonant circuit component, in particular, a coil, electrical resistance or capacitance, the electrical properties of which are a function of the setting of the camshaft adjuster, may be formed by several sub-components, where in this case a first sub-component is securely connected to the drive element of the adjustment module; and a second sub-component is securely connected to the output element of the adjustment module. In the case of an adjustable coil as the resonant circuit component having variable properties, one of the sub-components is configured as a current-carrying component; and the other sub-component, as a non-current carrying component.

According to a first possible embodiment, the variable inductance is a coil with a three dimensional structure in the case of the current-carrying sub-component; and in the case of the non-current carrying sub-component said variable inductance is an iron core, which dips into this coil and can be pivoted relative to the coil.

According to a second possible embodiment of the variable inductance, the current-carrying sub-component is designed as an essentially flat structure, in particular, as a so-called printed circuit, while in the case of the non-current carrying sub-component it is a sheet metal ring, which can be pivoted relative to the coil, which is present, for example, as a printed circuit or as a populated printed circuit board, and has at least one section having a width that is variable in the circumferential direction of the sheet metal ring. In this case the coil and the sheet metal ring are located in planes that are parallel to each other. In principle, a composite board having energizable windings, which act as a coil, is known, for example, from the European patent EP 2 225 816 B1.

In a preferred embodiment an electric motor is provided as the actuator of the camshaft adjuster. The stationary inductance, which can be allocated to the signal generator, is fastened preferably to an end face of the housing of the electric motor. The adjustment module, which can be actuated by the electric motor as an actuator, is designed preferably as a triple shaft transmission, where in this case the resonant circuit component with variable electrical properties is arranged preferably on the end face, which faces the electric motor, of the transmission housing of the triple shaft transmission.

Particularly advantageous is the fact that with the aid of the method of the invention the angle between two mutually pivotable, mutually rotatable elements, i.e., between the drive element and the output element of the adjustment module, can be measured, irrespective of whether and optionally at which speed the two said elements rotate together. The properties of the rotatable elements that can be detected from the stationary part of the measurement setup depend exclusively on the angular position of the two rotatable elements relative to each other, but not on the angular position or the state of motion of the arrangement of the rotatable elements altogether.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
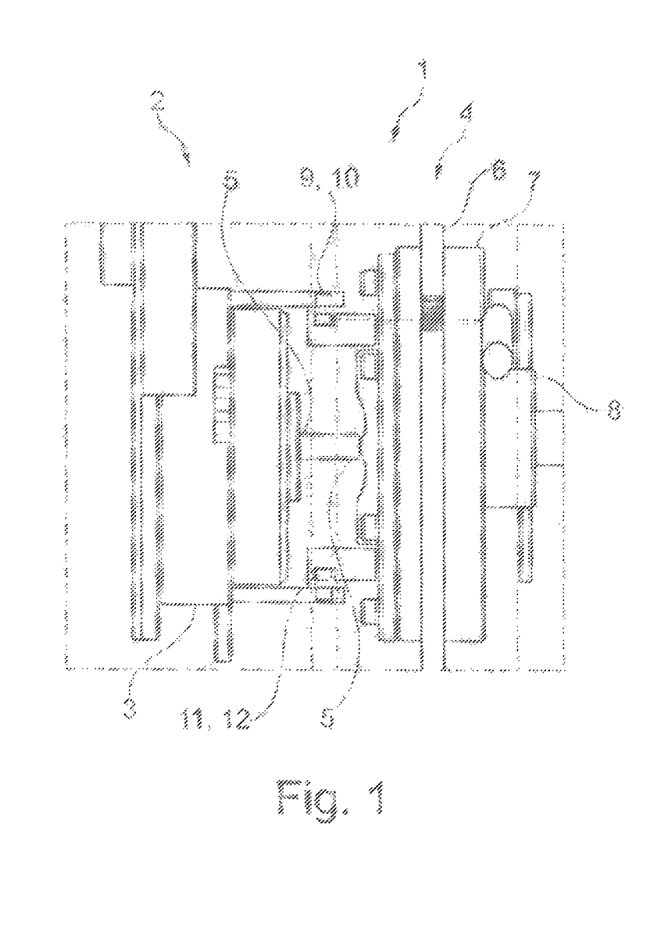
FIG. 1 is a camshaft adjuster with an electric actuator and a device for measuring the phase angle between the crankshaft and the camshaft.

FIG. 1 shows a camshaft adjuster, which is marked in its entirety with the reference numeral 1; and with respect to its basic functionality reference is made, for example, to the German patent documents DE 10 2008 039 009 A1 and DE 10 2011 083 800 A1.

Camshaft adjuster 1 comprises actuator 2, i.e., an electric motor with stationary housing 3, and adjustment module 4, which is also called a variator, which is designed as a triple shaft transmission. A shaft, which is provided with the reference numeral 5, is securely connected to the motor shaft of electric motor 2 and to an adjustment shaft of adjustment module 4 or is identical to at least one of these motor shafts or transmission shafts. A toothed gear acts as drive element 6 of adjustment module 4, with said toothed gear being securely connected to transmission housing 7 of adjustment module 4. An output element, which is labeled 8 and which is part of adjustment module 4, is securely connected to a camshaft of an internal combustion engine and rotates at the speed of drive element 6, as long as shaft 5 rotates at the same speed. If, on the other hand, the speed of shaft 5 deviates from the rotational speed of drive element 6, then output element 8 is adjusted at a high speed reduction ratio. This adjustment process constitutes an adjustment of the phase angle of the camshaft in relation to the crankshaft of the same internal combustion engine, which is not shown in greater detail. Variator 4 is designed, for example, as a wobble plate mechanism or a harmonic drive.

The components of a signal generator, which is marked in its entirety with the reference numeral 9, are attached to housing 3 of electric motor 2. In FIG. 1 signal generator coil 10 is indicated, the inductance of which is $L_0$ (see FIGS. 3 to 5). Signal generator coil 10 is located on the end face of electric motor 2 that faces adjustment module 4. Other components of signal generator 9 may be, for example, inside housing 3 or elsewhere in the internal combustion engine having fixed in position relative to camshaft adjuster 1.

An inductive coupling is provided between signal generator coil 10 and measurement circuit 11, which is integrated into adjustment module 4 and of which transmission coil 12 can be seen in FIG. 1. In the simplified representation according to FIG. 1, transmission coil 12 is radially inside signal generator coil 10. Signal generator coil 10 and transmission coil 12 could be just as well in adjacent planes. In any case the distance between said coils 10, 12 is at most a few millimeters.

Figure 3:
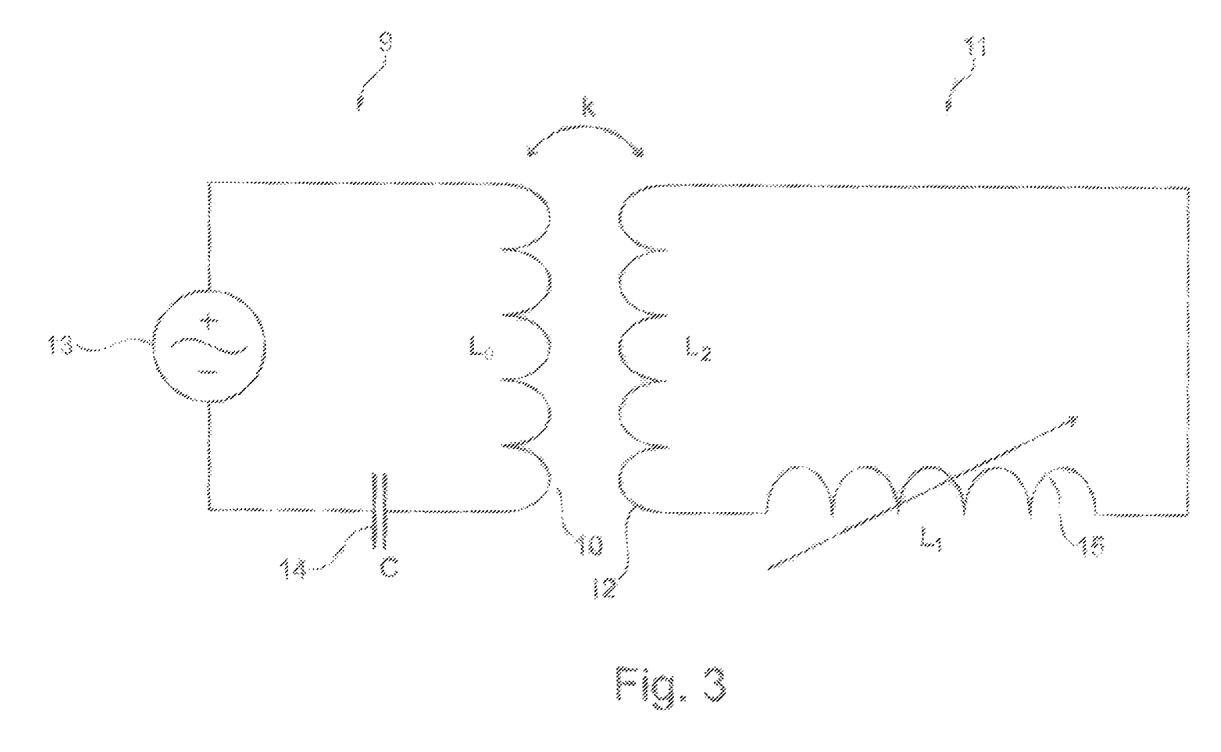
FIG. 3 illustrates a variant of a resonant circuit for the arrangement in FIG. 1.
Figure 4:
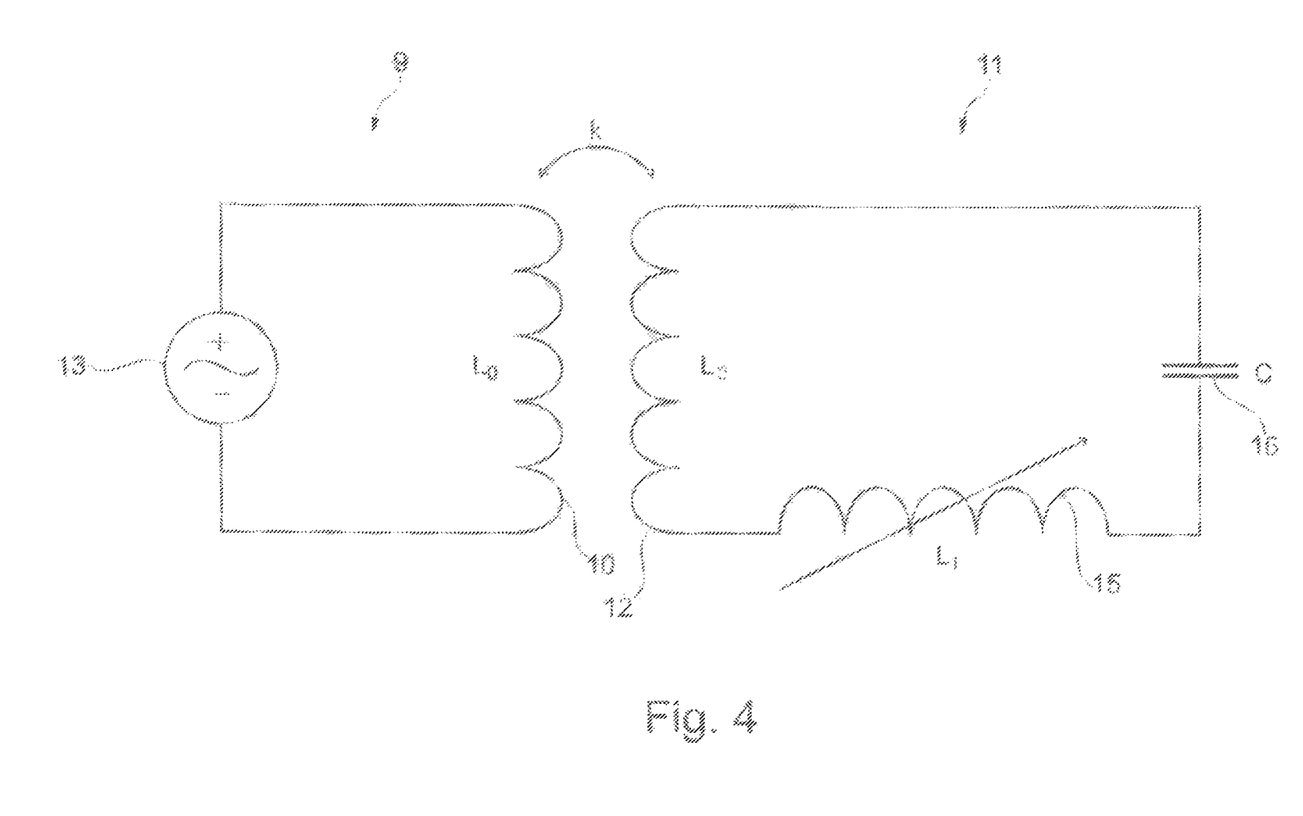
FIG. 4 illustrates a variant of a resonant circuit for the arrangement in FIG. 1; and, FIG. 5 illustrates a variant of a resonant circuit for the arrangement in FIG. 1.
Figure 5:
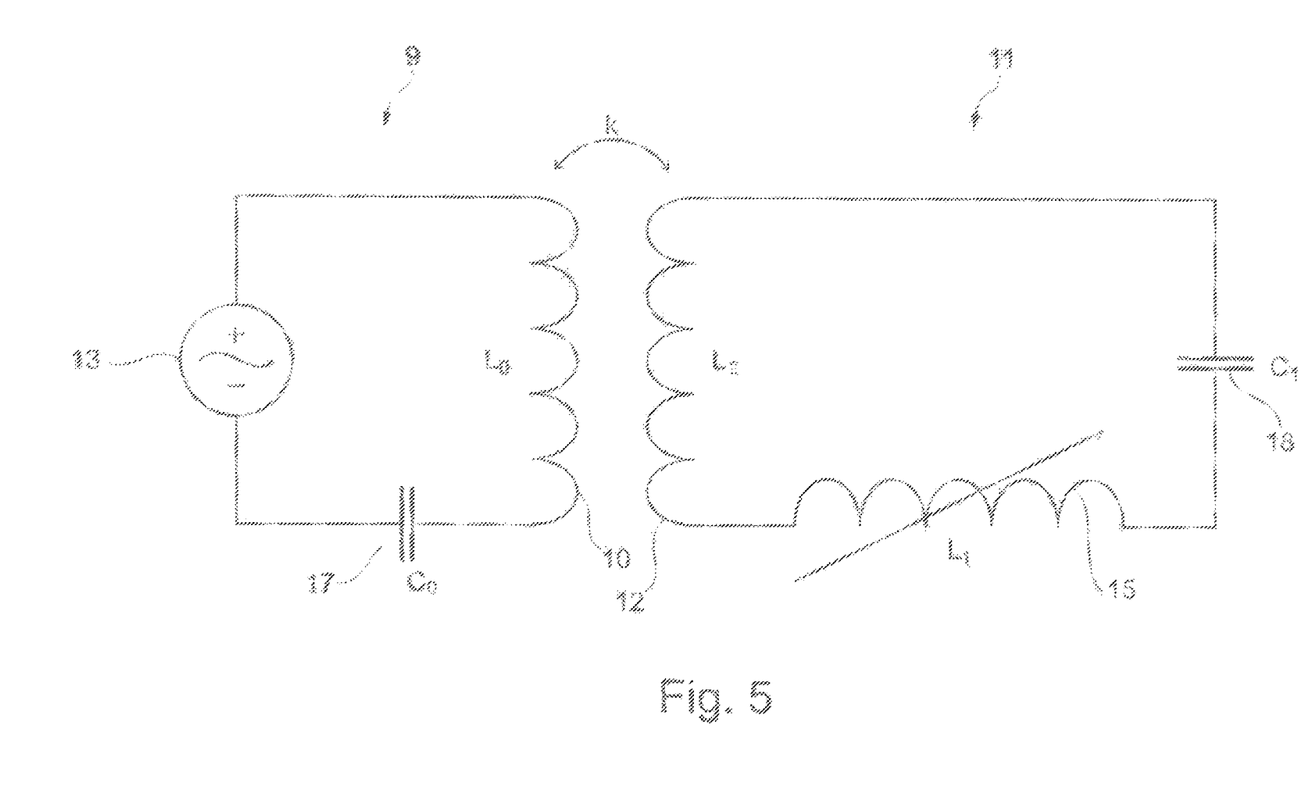

Possible configurations of signal generator 9 and measurement circuit 11, both of which can be integrated, according to FIG. 1, into camshaft adjuster 1, are shown in FIGS. 3 to 5. These configurations make it possible to implement the resonant circuits, with a line-conducted power supply being provided exclusively to the stationary parts of camshaft adjuster 1 in all cases. Electric power is supplied by frequency generator 13, which is part of signal generator 9, and generates a variable electric signal in an order of magnitude of a few kHz to MHz. The coupling between signal generator 9 and measurement circuit 11 is shown by a double arrow labeled k.

In the exemplary embodiment according to FIG. 3, signal generator 9 comprises, in addition to signal generator coil 10, capacitor 14 having capacitance C, as a result of which a complete resonant circuit is already formed. The properties of this resonant circuit are affected at the same time by measurement circuit 11, which has, in addition to transmission coil 12, adjustment coil 15. The inductance of adjustment coil 15 is referred to as first inductance $L_1$; the inductance of transmission coil 12, as second inductance $L_2$. The amount of first inductance $L_1$ depends on the angular position between drive element 6 and output element 8 of adjustment module 4, i.e., depends on the setting of camshaft adjuster 1, which will be discussed in still greater detail with reference to FIG. 2. Coupling k enables feedback between measurement circuit 11 and signal generator 9, with the feedback depending on the setting of camshaft adjuster 1. An attenuation, which is a function of the frequency, can be determined, in particular, in the resonant circuit, comprising signal generator coil 10, where in this case the frequency, at which the highest attenuation occurs, is a function of the electrical properties of measurement circuit 11, in particular, by the amount of first inductance $L_1$.

The measurement setup, according to FIG. 4, differs from the measurement setup of FIG. 3 by the fact that the electric circuit, comprising frequency generator 13, does not have a capacitance as a separate component, whereas, instead, capacitor 16 is part of measurement circuit 11. Furthermore, as in the exemplary embodiment according to FIG. 3, transmission coil 12 and adjustment coil 15 are components of the setup for measuring the setting of camshaft adjuster 1, according to FIG. 4.

The exemplary embodiment, according to FIG. 5, combines the features of the exemplary embodiments, according to FIG. 3 and FIG. 4, and includes capacitors 17, 18 having capacitance $C_0$ and $C_1$ respectively, both of which are in the electric circuit comprising signal generator coil 10 and/or transmission coil 12.

In each of the designs according to FIGS. 3 to 5, adjustment coil 15 is provided as a resonant circuit component having electrical properties that are a function of the phase angle between the camshaft and the crankshaft. As an alternative, it is also possible, for example, that capacitance C, $C_1$ or a resistance (not shown) inside measurement circuit 11 could have electrical properties that are a function of the torsion angle between drive element 6 and output element 8 of adjustment module 4. Similarly it is just as possible to implement embodiments, in which several components of measurement circuit 11 can be adjusted in such a way that a signal, which is a function of the setting of camshaft adjuster 1, is fed back to the stationary components of the measurement setup.

Figure 2:
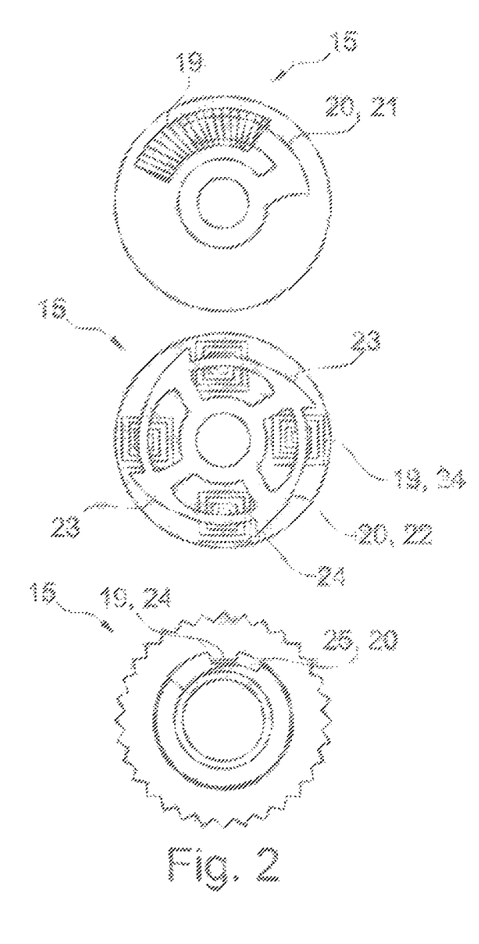
FIG. 2 illustrates various embodiments of an adjustable inductance shown in FIG. 1.

FIG. 2 shows three possible variants of adjustment coil 15, which can be built by choice into camshaft adjuster 1, according to FIG. 1, or can be integrated into each of the circuit arrangements according to FIGS. 3 to 5. Adjustment coil 15 comprises in all cases current-carrying component 19 (in the literal sense of the term the coil) as the first sub-component and non-current carrying component 20 as a second sub-component, which affects the properties of first sub-component 19.

According to the design of adjustment coil 15 shown at the top in FIG. 2, first current-carrying component 19 is a coil with three dimensional structure, into which pivotable iron core 21 dips as non-current carrying component 20. At the same time sub-components 19, 20 are securely connected to drive element 6 or output element 8 of camshaft adjuster 1, so that the angle between sub-components 19, 20 reflects the angle between said elements 6, 8 and, as a result, the setting of camshaft adjuster 1. In contrast to the simplified representation shown at the top in FIG. 2, current-carrying component 19 could also be implemented in the form of several individual coils, in each of which separate iron core 21 can dip. In this case the arrangement of all of the iron cores 21 forms second sub-component 20.

The design of adjustment coil 15, shown in the middle in FIG. 2, has a corresponding functionality. In this case current-carrying component 19 of adjustment coil 15, i.e., the coil in the literal sense of the term, is implemented as a printed circuit. First sub-component 19, which lies, thus, more or less in a plane, is arranged parallel to sheet metal ring 22, which acts, analogous to iron core 21, as a second non-current carrying component 20. Sheet metal ring 22 has four merging segments 23, each of which extends over 90 deg. and each of which has a width that varies in the circumferential direction of sheet metal ring 22. Segments 23 interact with four single coils 24, which together form current-carrying component 19 of adjustment coil 15, where in this case the current-carrying component is designed as a printed circuit. This design of adjustment coil 15 is distinguished by a particularly flat construction in the axial direction of camshaft adjuster 1 and, as a result, by an extremely small amount of space that is required on the end face of adjustment module 4 that faces actuator 2.

The design of adjustment coil 15, which is shown at the bottom in FIG. 2, has only single current-carrying component 19, which interacts with wedge 25 of non-current carrying component 20. In this case current-carrying component 19, i.e., single coil 24, is located radially outside of wedge 25 of the completely annular non-current carrying component 20. In contrast to the design that is shown, it is also possible to provide several, for example, four or six, single coils 24, opposite each of which there is wedge 25, which extends, for example, over an angle of at most 90 deg. or at most 60 deg.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE LABELS

C capacitance
$C_0$ capacitance
$C_1$ capacitance
k coupling
$L_0$ inductance
$L_1$ inductance
$L_2$ inductance
1 camshaft adjuster
2 actuator, electric motor
3 housing
4 adjustment module
5 shaft
6 drive element
7 transmission housing
8 output element
9 signal generator
10 signal generator coil
11 measurement circuit
12 transmission coil
13 frequency generator
14 capacitor
15 adjustment coil
16 capacitor
17 capacitor
18 capacitor
19 current-carrying component, first sub-component
20 non-current carrying component, second sub-component
21 iron core
22 sheet metal ring
23 segment
24 single coil
25 wedge

What is claimed is:

1. A camshaft adjuster for adjusting a phase angle between a crankshaft and a camshaft of an internal combustion engine, the camshaft adjuster comprising:
   an actuator;
   a signal generator having an inductance, the signal generator arranged to be fixed on the internal combustion engine; and,
   a variator arranged axially between the actuator and the camshaft, the variator including:
      a first end configured to be coupled to a shaft of the actuator;
      a drive element configured to be driven by the crankshaft; and,
      an output element configured to be rotated within a pre-determined range relative to the drive element and coupled to the camshaft; and,
      a measurement circuit inductively coupled to the signal generator and integrated within at least one rotatable component of the variator, the measurement circuit including at least one resonant circuit component having electrical properties which vary depending on the phase angle.

2. The camshaft adjuster of claim 1, wherein a first inductance is provided as the resonant circuit component.

3. The camshaft adjuster of claim 2, wherein a second inductance is connected in series to the first inductance, and the second inductance is not variable, and wherein only the second inductance is coupled between the measurement circuit and the signal generator.

4. The camshaft adjuster of claim 1, further comprising a transmission housing secured to the drive element, wherein a first sub-component of the resonant circuit component is attached to the transmission housing; and a second sub-component of the resonant circuit component is attached to the output element.

5. The camshaft adjuster of claim 4, wherein one of the first sub-component or the second sub-component is configured as a current-carrying component; and a remaining one of the first sub-component or the second sub-component is configured as a non-current carrying component.

6. The camshaft adjuster of claim 5, wherein the current-carrying component is configured as a coil with three dimensional structure; and the non-current carrying component is an iron core, which dips into the coil and is configured to pivot relative to the coil.

7. The camshaft adjuster of claim 5, wherein the current-carrying component is configured as a coil, which is implemented in a form of a printed circuit; and the non-current carrying component is a sheet metal ring, which is configured to pivot relative to the coil, arranged parallel to the coil, and has a width that varies in a circumferential direction of the sheet metal ring.

8. The camshaft adjuster of claim 1, wherein an electric motor is provided as the actuator, and a stationary inductance is fixed on a housing of the electric motor.

9. The camshaft adjuster of claim 8, wherein the variator is designed as a triple shaft transmission, and the resonant circuit component is disposed on a face of a transmission housing of the triple shaft transmission.

10. A method for measuring a setting of a camshaft adjuster configured for adjusting a phase angle between a crankshaft and a camshaft of an internal combustion engine, the method comprising:
   supplying a stationary inductance configured to be fixed in position relative to the internal combustion engine, and applying a signal to the stationary inductance,
   producing an inductive coupling with a measurement circuit, the measurement circuit being totally formed within at least one rotatable component of the camshaft adjuster, the at least one rotatable component arranged axially between an actuator of the camshaft adjuster and the camshat, and electrical properties of the measurement circuit vary depending on the setting of the camshaft adjuster; and, measuring a fed back signal, which varies depending on the setting of the camshaft adjuster, and which is picked up by the stationary inductance.

11. A camshaft adjuster for adjusting a phase angle between a crankshaft and a camshaft of an internal combustion engine, the camshaft adjuster comprising:
- an electric motor;
- a signal generator having an inductance; and,
- a variator arranged axially between the electric motor and the camshaft, the variator including:
  - a transmission housing configured to be driven by the crankshaft; and,
  - a transmission configured to be coupled to the electric motor;
  - an output element configured to be rotated within a pre-determined range relative to the transmission housing, the output element configured to be coupled to the camshaft; and,
  - a measurement circuit inductively coupled to the signal generator, the measurement circuit formed within at least one of the transmission housing, the transmission, or the output element, and including at least one resonant circuit component having electrical properties which vary depending on the phase angle.

* * * * *